Patented Nov. 22, 1932

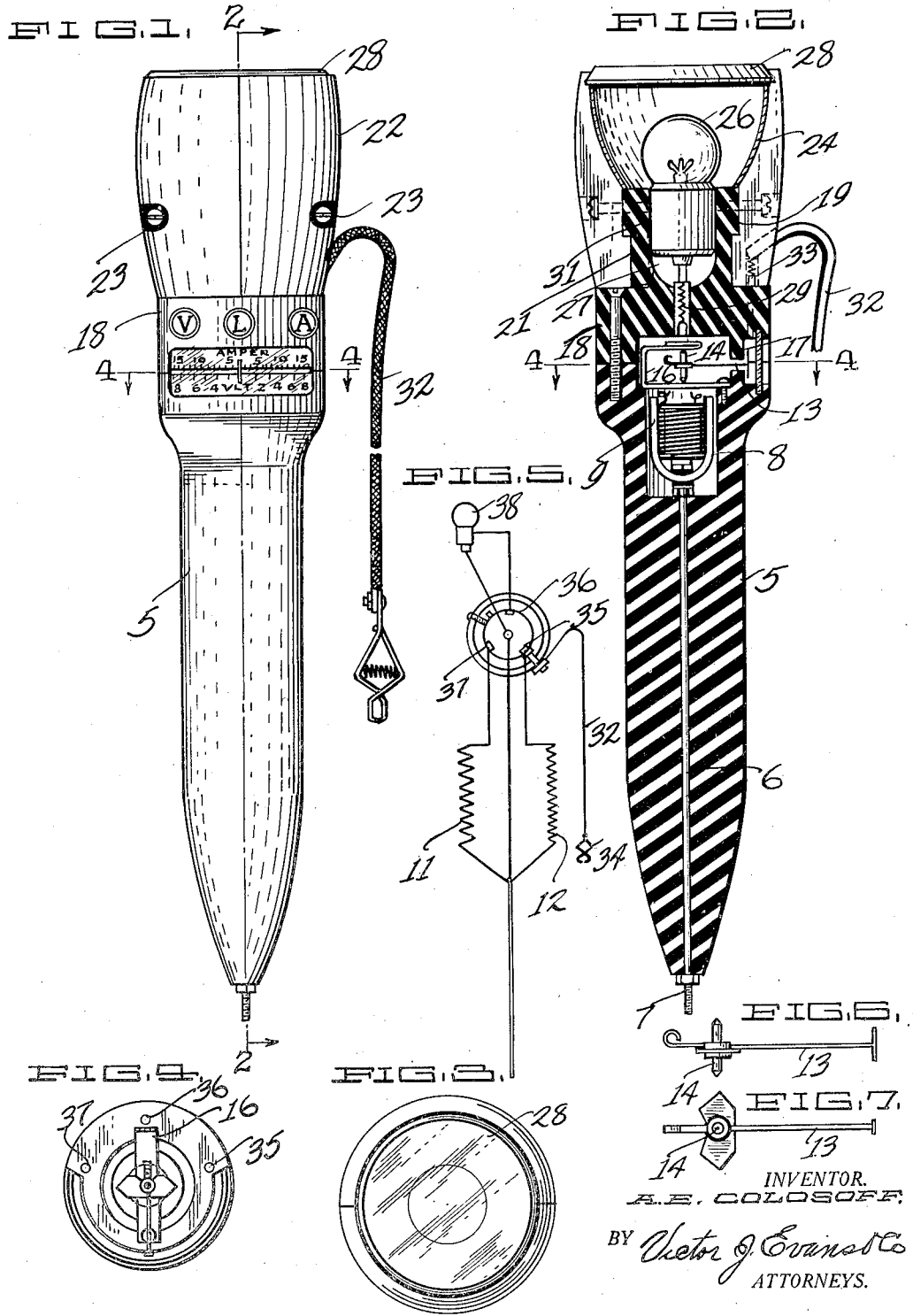

1,888,906

UNITED STATES PATENT OFFICE

ANATOLY E. COLOSOFF, OF BERKELEY, CALIFORNIA

TESTING APPARATUS

Application filed October 3, 1931. Serial No. 566,731.

This invention relates to improvements in testing apparatus and has particular reference to a device for testing the electric circuits of an automobile.

A further object is to produce a device wherein either the voltage or amperage may be checked, and also to provide visible means whereby a break in the circuit may be detected.

A further object is to produce a device which is easily assembled and one which is amply protected against breakage in use.

A further object is to produce a device wherein the user will be completely insulated from the electric circuit and will, therefore, not receive a shock.

Other objects and advantages will be apparent during the course of the following description.

In the accompanying drawing forming a part of this specification and in which like numerals are employed to designate like parts throughout the same, Figure 1 is a side elevation of my device, Figure 2 is a cross sectional view taken on the line 2—2 of Figure 1, Figure 3 is a top plan view of Figure 1, Figure 4 is a cross sectional view taken on the line 4—4 of Figures 1 and 2, Figure 5 is a diagrammatic view of the wiring of my device, Figure 6 is a side elevation of the ampere meter pointer, and Figure 7 is a top plan view of Figure 6.

In the testing of automobile circuits it is often necessary to measure the voltage or amperage at different points. It also happens that a break may occur, which break is not visible. In order to test the voltage, contact must be made at two points and the voltage or amperage read upon a meter. With the present device, should a break occur in the circuit, by connecting two opposite sides of the break and by rotating the top of the device, a lamp may be thrown into circuit with the result that the current flowing around the break and through the device, will illuminate the lamp.

In the accompanying drawing wherein for the purpose of illustration is shown a preferred embodiment of my invention, the numeral 5 designates a tubular piece made of any material which is non-conducting. A contact wire 6 extends through the tubular piece 5 and has a point 7 extending beyond the end thereof and has its opposite extremity extending through and insulated from a permanent U-shaped magnet 8, between the lengths of which is positioned a coil 9, having a heavy and light winding thereon, the heavy winding being indicated at 11 in Figure 5 and the light winding at 12, the same figure. The heavy winding serves as an amperage reading while the light winding 12 serves for a voltage reading. This arrangement is adapted to actuate a pointer 13 carried upon a bearing pin 14, which bearing pin is positioned in a yoke 16 in such a manner that the free end of the pointer extends through a slot 17 formed between the tubular portion 5 and a cap 18. This cap carries an upstanding projection 19 having a recessed groove 21. This groove serves to rotatably hold upon the portion 19, a divided housing 22 held together by screws 23. Within this housing 22 is positioned a reflector 24 so as to reflect light from a bulb 26 positioned within a bore 27 formed in the upstanding portion 19.

A lens is shown at 28 to permit the light to shine therefrom. A contact 29 conducts current to the bottom of the bore, and a contact 31 conducts current to the side of the bore. A cable 32 extends from a spring contact 33 and has a clip 34 attached to its free end. The spring contact 33 is adapted to engage contacts 35, 36 and 37 when the housing 22 is rotated on the upstanding portion 19 of the cap 18, the result being that as the rotation takes place a circuit may be established from the point 7 through either the windings 11, 12 or through the light 38 and thence returned through the cable 32 and clip 34.

This present device is an improvement over my tester described in my previous Patent No. 1,707,051, granted March 26th, 1929, the difference in this case being in the details of construction which permit of a more ready assembly, a stronger device and one which will more effectively house the meter, thus tending to give a more accurate reading.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, a tubular member, a conductor extending through said tubular member, said tubular member having a recess formed therein, a magnet secured to said conductor and insulated therefrom, an electromagnetic coil mounted between the legs of said magnet, said coil having a voltage winding and an amperage winding thereon, one end of each of said windings being connected to said conductor, the opposite ends of said windings being connected to contacts, a cap positioned on said tubular member and having said contacts extending therethrough, an indicator positioned between said tubular member and said cap, said indicator having its pointer adapted to move over indicia, a housing rotatably mounted on said cap, a cable secured to said housing, a bulb carried by said housing, a spring contact carried by said housing, and being connected to said cable whereby when said housing is rotated said contact will engage said first mentioned contacts.

In testimony whereof I affix my signature.

ANATOLY E. COLOSOFF.